Patented Sept. 23, 1947

2,427,878

UNITED STATES PATENT OFFICE 2,427,878

DIALKYLAMINOPROPYL ETHERS OF BENZHYDROL

George Rieveschl, Jr., Grosse Pointe Woods, Mich., assignor to Parke, Davis & Company, Detroit, Mich., a corporation of Michigan No Drawing. Application April 8, 1947,
Serial No. 739,985

9 Claims. (Cl. 260—570)

This invention relates to amino ethers and their acid addition salts and to methods for obtaining the same. More specifically, the invention relates to basically substituted benzhydryl ethers and their acid addition salts. The free bases of the basically substituted benzhydryl ethers of the invention have the formula,

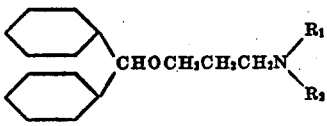

where $R_1$ and $R_2$ represent the same or different alkyl radicals containing not more than 4 carbon atoms.

The compounds of the present invention may be obtained as a free base having the formula given above or as acid addition salts of the base with inorganic or organic acids. Some examples of the salts which may be prepared by the methods hereinafter described are the hydrochloride, hydrobromide, hydroiodide, sulfate, phosphate, acetate, citrate, oxalate, succinate, benzoate, tartrate, phthalate, maleate, oleate and the like.

The basically substituted benzhydryl ether compounds may be prepared by several different processes. For example, these compounds may be prepared by the condensation of a benzhydryl halide with a γ-dialkylaminopropanol. The condensation of these two reactants may be carried out by several different methods, e. g. it may be effected in the presence or absence of an acid-binding agent or with or without a solvent. Another method for preparing these compounds consists in reacting an alkali metal salt of benzhydrol with a γ-dalkylaminopropyl halide or, if desired, the reactants may be interchanged and an alkali metal salt of a γ-dialkylaminopropanol reacted with a benzhydryl halide. A further method of preparation consists in reacting a γ-halopropyl benzhydryl ether with an appropriate dialkylamine.

The free bases and the acid addition salts of the basically substituted benzydryl ethers are powerful anti-histamine agents. They are also useful in preventing smooth muscle spasms induced by histamine, acetyl choline or barium chloride. Another property of these compounds is that they inhibit gastric secretion which has been induced either by meal or histamine stimulus. The new compounds may be administered to humans orally, parenterally, rectally or as a vapor or mist. They find particular use in humans for treatment of allergic conditions (asthma, urticaria, histamine cephalagia and anaphylactic shock) and smooth muscle spasms (biliary spasm and dysemenorrhea). For example, the compound shown in Example 1, γ-diethylaminopropyl benzhydryl ether hydrochloride, may be administrted to humans orally in a dosage of 100 to 600 mg. per day and intravenously in a dosage of 10 to 100 mg. per day. However, because of the high activity of this compound and the other compounds of this invention, it has been found that a dosage of 150 mg. per day orally or 20 mg. per day by the intravenous route is usually sufficient in the treatment of smooth muscle spasms and most allergic conditions.

This application is a continuation-in-part of my copending application, Serial No. 531,639, filed April 18, 1944, now Patent No. 2,421,714, issued June 3, 1947.

The invention is illustrated by the following examples.

*Example 1. γ-Diethylaminopropyl benzhydryl ether*

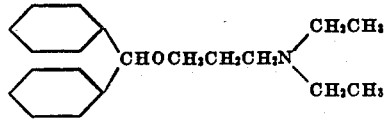

9.2 g. of sodium is added to 27.1 g. of γ-diethylaminopropanol in 100 cc. of benzene and the mixture refluxed on a water bath for eight hours, cooled and 49.4 g. of benzhydryl bromide added. The resulting mixture is refluxed for ten hours, cooled and filtered to remove the sodium bromide. The filtrate is distilled under reduced pressure to obtain the free base of the desired γ-diethylaminopropyl benzhydryl ether boiling at 182–3° C./4.5 mm. (bath temperature 250–90° C.); yield 8.9 g.

The free base can be converted to the hydrochloride salt by dissolving it in dry ether and treating the resulting solution with an excess of dry hydrogen chloride gas. The hydrochloride salt which separates from the solution is collected and purified by recrystallization from isopropanol-acetone or ether mixture. In some instances difficulty is encountered in crystallizing this hydrochloride salt due to the fact that it contains a small amount of water. This may be overcome by evaporating the ether-salt mixture to dryness and then placing it in vacuo over phosphorus pentoxide for about one day. The dry material thus obtained is taken up and recrystallized from isopropanol.

*Example 2.  γ-Dimethylaminopropyl benzhydryl ether*

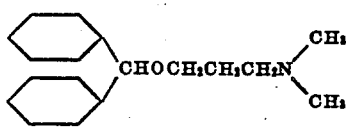

247 g. of benzhydryl bromide is added to a refluxing solution of 206 g. of γ-dimethylaminopropanol in 100 cc. of xylene. After the addition has been completed, the mixture is refluxed about fifteen hours, cooled and the lower layer consisting of the hydrobromide salt of γ-dimethylaminopropanol drawn off. The xylene is distilled from the upper layer in vacuo and the cool residue dissolved as completely as possible in dilute hydrochloric acid. After extraction of insoluble material with ether, the acidic aqueous solution is made alkaline with 10 N sodium hydroxide and the desired free base extracted with ether. The ether extracts are dried, the ether evaporated and the residue distilled under a pressure of about 3 mm. of mercury to obtain the free base in pure form.

If desired, the free base can be converted to the hydrobromide salt by dissolving it in isopropanol and adding an excess of an isopropanol solution of hydrogen bromide. Ether is added and the crude salt which separates collected and purified by recrystallization from isopropanol.

By substituting an isopropanol solution of hydrogen chloride for the hydrogen bromide solution used in the preparation of the hydrobromide salt, one obtains the hydrochloride salt of γ-dimethylaminopropyl benzhydryl ether as a white crystalline solid.

*Example 3.  γ-Di-n-butylaminopropyl benzhydryl ether*

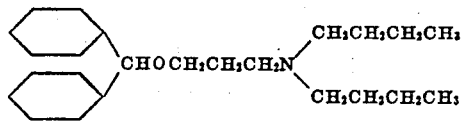

23 g. of sodium wire is added to a solution of 200 g. of γ-di-n-butylaminopropanol in 500 cc. of dry benzene and the resulting mixture stirred and heated until all the sodium has reacted with the amino alcohol. A solution of 247 g. of benzhydryl bromide in 300 cc. of dry benzene is added slowly to the rapidly stirred and refluxing mixture and after the addition has been completed the mixture is refluxed for fifteen hours. The mixture is cooled, washed with several portions of water to remove the sodium bromide and the organic layer distilled in vacuo to remove the benzene and excess amino alcohol. The residue is treated with dilute hydrochloric acid and extracted with ether. The ether extracts are discarded and the aqueous solution made alkaline with 20% sodium hydroxide solution in the cold. The free base is extracted with ether, the ether extracts dried and the ether distilled. The residue is distilled in vacuo (about 2 to 3 mm. of mercury) to obtain the pure free base of the desired γ-di-n-butylaminopropyl benzhydryl ether as a very pale yellow, viscous liquid.

If desired, the free base can be converted to a hydrohalide salt by dissolving it in ether and treating the resultant solution with an excess of the gaseous hydrohalide. The crude salt which separates is collected and purified by recrystallization from isopropanol-acetone or ether mixture.

Some further examples of the compounds of the invention which can be prepared by the hereinbefore described methods have the following formulae for the free base:

1.
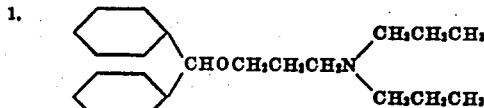

2.
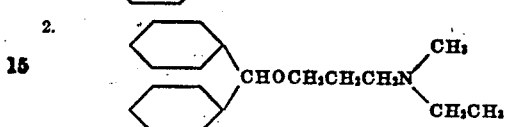

3.
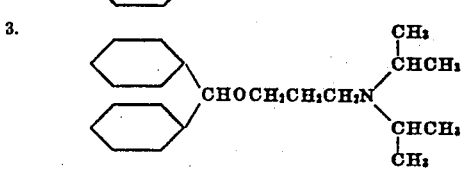

Attention is called to the fact that compounds somewhat related to those claimed herein are described and claimed in my copending applications as follows: Serial No. 531,639, filed April 18, 1944, now Patent No. 2,421,714 issued June 3, 1947; Serial No. 640,685, filed January 11, 1946; Serial No. 640,686, filed January 11, 1946; Serial No. 640,687, filed January 11, 1946; Serial No. 660,406, filed April 8, 1946; Serial No. 688,424, filed August 5, 1946; Serial No. 688,425, filed August 5, 1946; Serial No. 688,426, filed August 5, 1946; Serial No. 688,427, filed August 5, 1946; Serial No. 751,983, filed June 2, 1947; Serial No. 751,984, filed June 2, 1947; and Serial No. 751,985, filed June 2, 1947. Other copending applications describing and claiming certain novel processes for the preparation of the compounds herein claimed and others somewhat related thereto are as follows: Serial Nos. 688,420, 688,421, 688,422 and 688,423, all filed August 5, 1946.

What I claim as my invention is:

1. A compound of the class consisting of a free base and its salts, said free base having the formula,

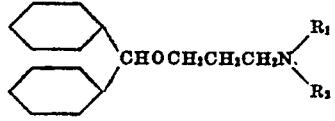

where $R_1$ and $R_2$ are each alkyl containing not more than four carbon atoms.

2. A compound having the formula,

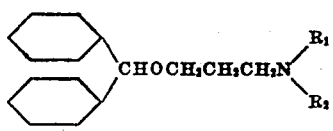

where $R_1$ and $R_2$ are each alkyl containing not more than four carbon atoms.

3. A salt of a compound having the following formula for the free base,

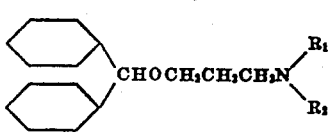

where $R_1$ and $R_2$ are each alkyl containing not more than four carbon atoms.

4. The hydrochloride salt of a compound having the following formula for the free base,

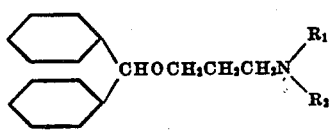

where $R_1$ and $R_2$ are each alkyl containing not more than four carbon atoms.

5. A salt of γ-diethylaminopropyl benzhydryl ether.

6. The hydrochloride salt of γ-diethylaminopropyl benzhydryl ether.

7. A salt of γ-dimethylaminopropyl benzhydryl ether.

8. The hydrochloride salt of γ-dimethylaminopropyl benzhydryl ether.

9. γ-Dimethylaminopropyl benzhydryl ether.

GEORGE RIEVESCHL, Jr.